(12) United States Patent
Kim et al.

(10) Patent No.: US 9,348,146 B2
(45) Date of Patent: May 24, 2016

(54) APPARATUS FOR PROJECTING SPACE IMAGE

(71) Applicant: KWANGWOON UNIVERSITY INDUSTRY-ACADEMIC COLLABORATION FOUNDATION, Seoul (KR)

(72) Inventors: Eun-Soo Kim, Seoul (KR); Seung-Cheol Kim, Seoul (KR)

(73) Assignee: KWANGWOON UNIVERSITY INDUSTRY—ACADEMIC COLLABORATION FOUNDATION, Seoul (KR)

( * ) Notice: Subject to any disclaimer, the term of this patent is extended or adjusted under 35 U.S.C. 154(b) by 347 days.

(21) Appl. No.: 13/773,364

(22) Filed: Feb. 21, 2013

(65) Prior Publication Data
US 2013/0215393 A1    Aug. 22, 2013

(30) Foreign Application Priority Data
Feb. 22, 2012   (KR) .......................... 10-2012-0017816

(51) Int. Cl.
*G03B 21/00*    (2006.01)
*G02B 27/22*    (2006.01)

(52) U.S. Cl.
CPC .................................. *G02B 27/2292* (2013.01)

(58) Field of Classification Search
CPC ........... G02B 27/2292; G02B 27/2214; G02B 27/22; G02F 1/13; G03B 21/00; H04N 13/04
USPC .......................................................... 353/7, 10
See application file for complete search history.

(56) References Cited

U.S. PATENT DOCUMENTS

2010/0188489 A1*   7/2010   Mashitani et al. .............. 348/53

FOREIGN PATENT DOCUMENTS

| JP | 1992-248583 A | 9/1992 |
| JP | 1993-336549 A | 12/1993 |
| JP | 05336549 A * | 12/1993 |
| JP | 1997-243960 A | 9/1997 |
| JP | 2006-317883 | 11/2006 |
| JP | 2009-63914 A | 3/2009 |
| JP | 2010-197917 A | 9/2010 |
| JP | 2011-154337 | 8/2011 |

OTHER PUBLICATIONS

Partial English translation of abstract of a Korean Office Action issued on Apr. 13, 2013 from priority Korean Patent Application No. 10-2012-0017816.

(Continued)

*Primary Examiner* — Sultan Chowdhury
*Assistant Examiner* — Danell L Owens
(74) *Attorney, Agent, or Firm* — Knobbe, Martens, Olson & Bear, LLP

(57) ABSTRACT

An apparatus for projecting a space image in accordance with an embodiment of the present invention includes: a receiving unit configured to receive the space image; a display unit configured to display the space image and to emit light; a control unit configured to control the display unit to display the space image; and a projection unit configured to allow the light to permeate or reflect the light and to project the space image.

5 Claims, 11 Drawing Sheets

(56) References Cited

OTHER PUBLICATIONS

Japanese Office Action dated May 7, 2014 for Japanese Patent Application No. 2013-032278 which shares priority of Korean Patent Application No. KR 10-2011-0078287 with captioned U.S. Appl. No. 13/773,364.

JP Office Action in JP Application No. 2013-032278 A, dated Jan. 7, 2014.

* cited by examiner

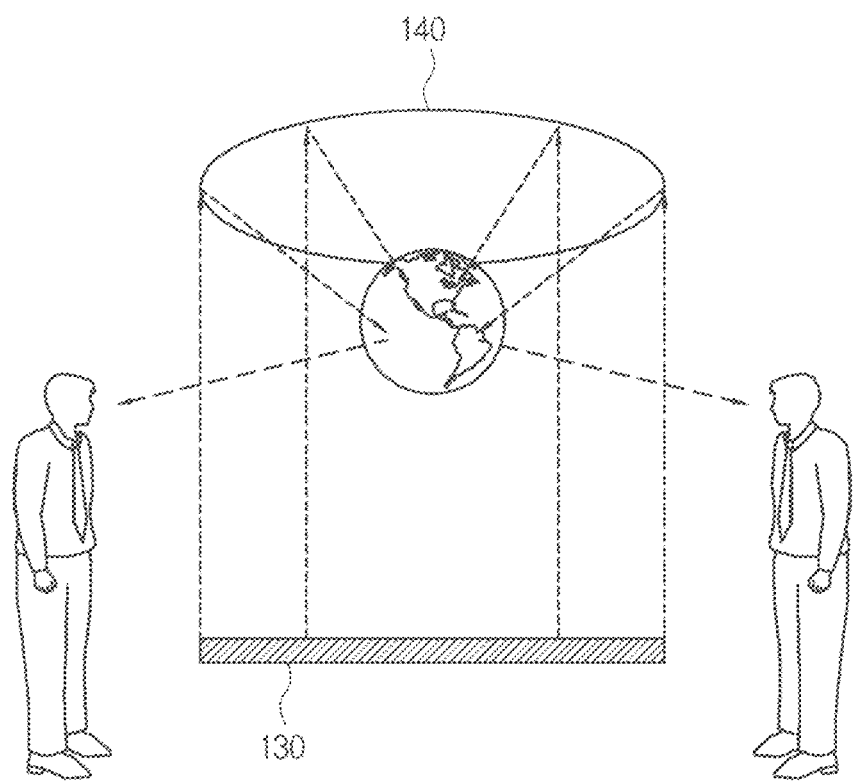

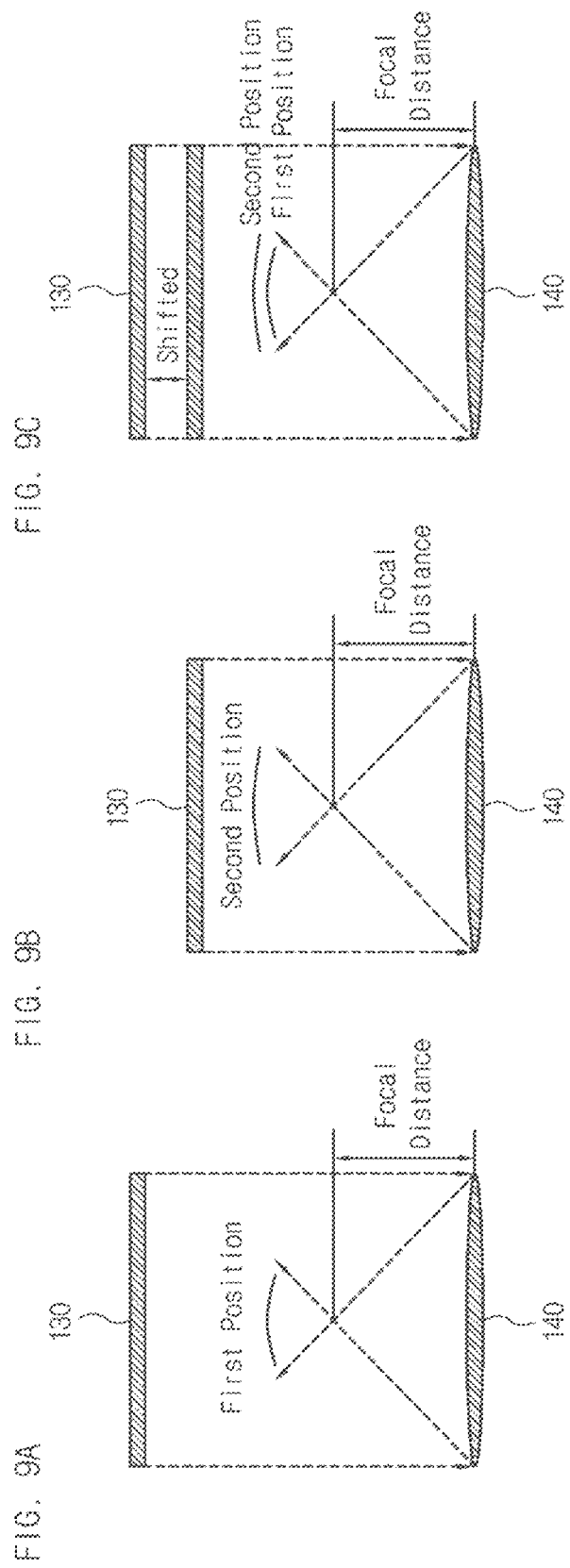

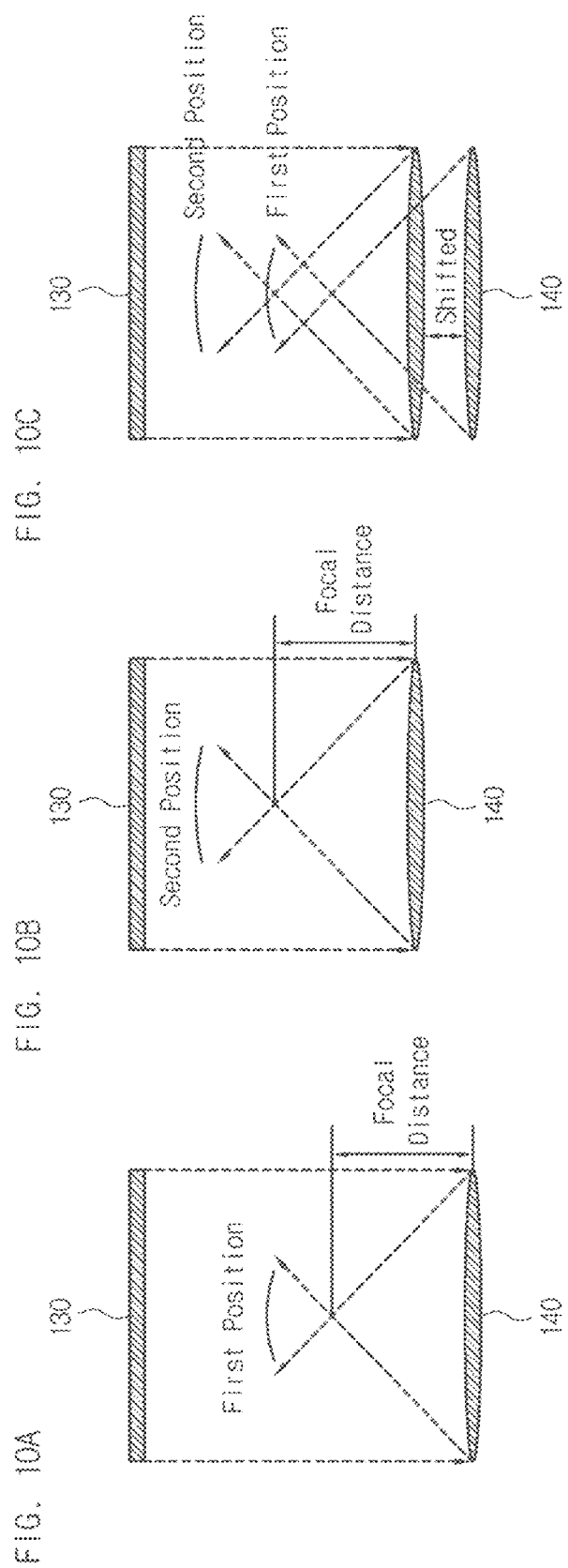

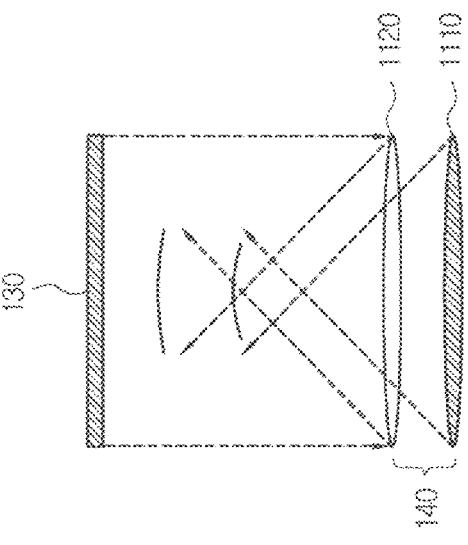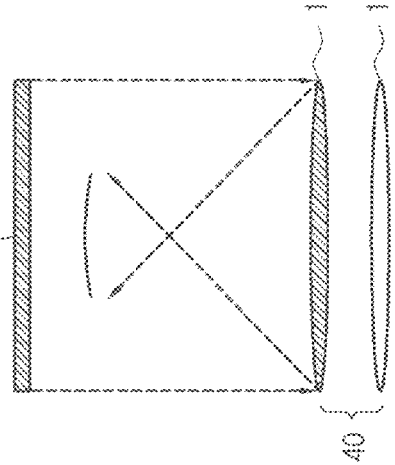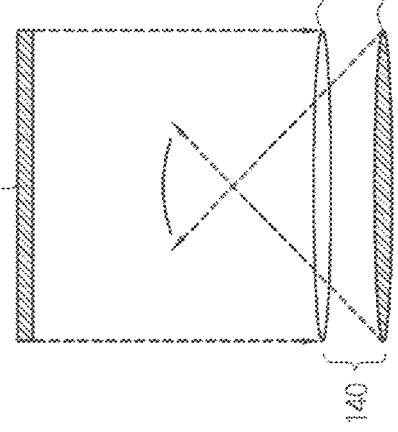

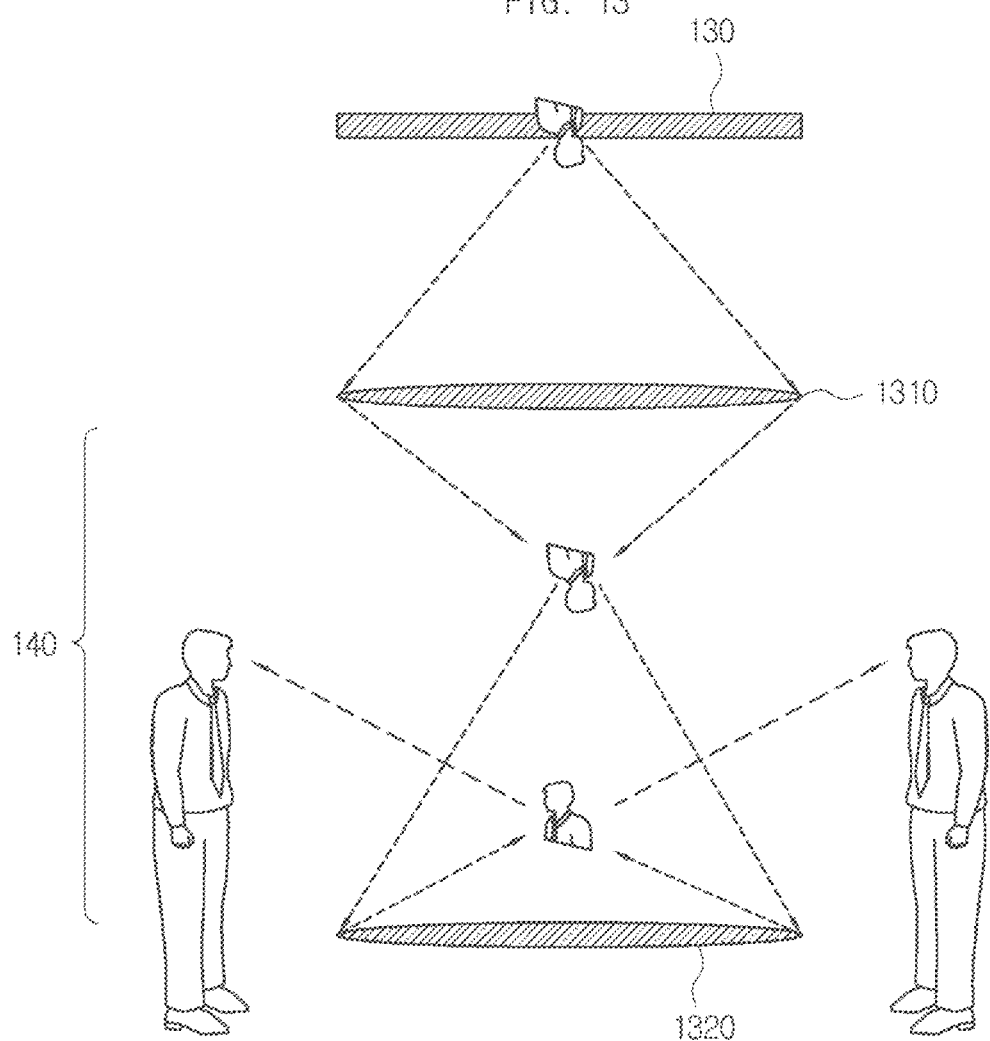

APPARATUS FOR PROJECTING SPACE IMAGE

CROSS-REFERENCE TO RELATED APPLICATIONS

This application claims the benefit of Korean Patent Application No. 10-2012-0017816, filed with the Korean Intellectual Property Office on Feb. 22, 2012, the disclosure of which is incorporated herein by reference in its entirety.

INCORPORATION BY REFERENCE TO RELATED APPLICATIONS

Any and all priority claims identified in the Application Data Sheet, or any correction thereto, are hereby incorporated by reference under 37 CFR 1.57.

BACKGROUND

1. Field of the Invention

Embodiments of the present invention relate to an apparatus for projecting a space image, more specifically to projecting a space image in a space through a projecting part.

2. Description of Related Art

Unlike two-dimensional images, space images render a depth. Man can sense a three-dimensional effect when the space image is seen through both eyes.

An apparatus for projecting a space image provides the three-dimensional effect to man as if a real object is seen, by projecting the space image.

The space image is projected by applying 3D display technologies using, for example, polarization, shutter glass, parallax barrier, lenticular and the like, but these methods require a user to wear specially-designed glasses in order for the user to see the 3D images or provide a restricted viewing angle even if the glasses are not required.

Another method for projecting a space image is the volume method using a spinning screen, in which case the 3D image can be viewed from every direction but the image cannot be touched due to the lack of screen.

SUMMARY

Some embodiments of the present invention provide an apparatus and a method for projecting a space image in which the image projected to a space can be viewed from every direction.

In one embodiment, the present invention also provides an apparatus and a method for projecting a space image in which a focus is changed according to the image.

In one embodiment, an aspect of the present invention features an apparatus for projecting a space image. The apparatus for projecting a space image in accordance with an embodiment of the present invention includes: a receiving unit configured to receive the space image; a display unit configured to display the space image and to emit light; a control unit configured to control the display unit to display the space image; and a projection unit configured to allow the light to permeate or reflect the light and to project the space image.

The projection unit can include any one of a convex lens, an array of convex lenses, a concave mirror, an array of concave mirrors, a concave lens, an array of concave lenses and a transparent spherical body placed in front of the display unit.

The display unit can include: a light-emitting part comprising a light-emitting device configured to emit light according to the space image; and a parallax barrier comprising a barrier screen in which transmissive areas and barrier areas are alternately arranged, the transmissive areas being configured to allow the light emitted by the light-emitting device to permeate and the barrier areas being configured to block the light.

The apparatus for projecting a space image can also include a motor configured to move at least one of the display unit and the projection unit. The receiving unit can be configured to further receive a projection position signal for requesting a change of a position at which the space image is projected, and the control unit can be configured to control the motor in accordance with the projection position signal to move at least one of the display unit and the projection unit.

The projection unit can include a first lens and a second lens which are a liquid crystal lens or a liquid lens placed in front of the display unit. The receiving unit can be configured to further receive a projection position signal for requesting a change of a position at which the space image is projected, and the control unit can be configured to switch a state of each of the first lens and the second lens to an operation state or a non-operation state in accordance with the projection position signal.

The second lens can be arranged in between the first lens and the display unit. The control unit can be configured to switch the state of the first lens to the operation state and switch the state of the second lens to the non-operation state if the projection position signal is a signal for requesting the space image to be projected at a first position. The control unit can be configured to switch the state of the first lens to the non-operation state and switch the state of the second lens to the operation state if the projection position signal is a signal for requesting the space image to be projected at a second position.

The projection unit can include, alone and/or in any order a combination of, a first convex lens, a first shutter, a first concave lens, a second convex lens, a second shutter, a second concave lens and a third convex lens. The receiving unit can be configured to further receive a projection position signal for requesting a change of a position at which the space image is projected, and the control unit can be configured to control opening or closing of the first shutter and the second shutter in accordance with the projection position signal.

The first convex lens can be closest to the display unit among said lenses. The controls unit can be configured to control the first shutter to be closed if the projection position signal is for requesting the space image to be projected at a first position. The control unit can be configured to control the first shutter to be opened and the second shutter to be closed if the projection position signal is for requesting the space image to be projected at a second position.

The projection unit can include: a floating lens configured to project the space image at a first position by allowing the light emitted by the display unit to permeate; and a floor lens configured to project the space image at a second position by reflecting the light projected from the floating lens. The floor lens can be arranged in front of the display unit, and the floating lens can be arranged in between the display unit and the floor lens.

BRIEF DESCRIPTION OF THE DRAWINGS

FIG. 7 illustrates a display unit and a projection unit in accordance with a sixth embodiment of the present invention.

FIGS. 9A to 9C illustrate some examples of locations where the space image is projected using a volume display unit of an apparatus for projecting a space image.

FIGS. 10A to 10C illustrate examples of locations where the space image is projected when the locations for a projection unit of an apparatus for projecting a space image is changed.

FIGS. 11A to 11C illustrate a display unit and a projection unit in accordance with a seventh embodiment of the present invention.

FIG. 13 illustrates a display unit and a projection unit in accordance with a ninth embodiment of the present invention.

DETAILED DESCRIPTION

Hereinafter, some embodiments of the present invention will be described in detail with reference to the accompanying drawings. When it is determined that describing certain known configurations or function in detail will evade the gist of this specification, such description will not be provided herein.

Moreover, the elements appearing in the embodiments of the present invention are independently illustrated to indicate different functions from one another and do not mean that they are constituted as separate hardware or one software unit. In other words, the elements are listed as separate elements for the convenience of description, but it is possible that two or more elements are combined to form one element or that one element is divided into a plurality of elements to perform a function or functions. It shall be appreciated that an embodiment of combined elements or separated elements is also covered by the scope of the present invention as long as it does not escape the gist of the present invention.

Furthermore, some elements are not essential for performing a substantial function in the present invention but are optional for simply improving a function. In one embodiment, the present invention can be realized by only including the essential elements for realizing the substance of the present invention and excluding the elements for performance improvement only, and the structure including the essential elements only without the optional elements for simple performance improvement is also covered by the scope of the present invention.

Figure 1:
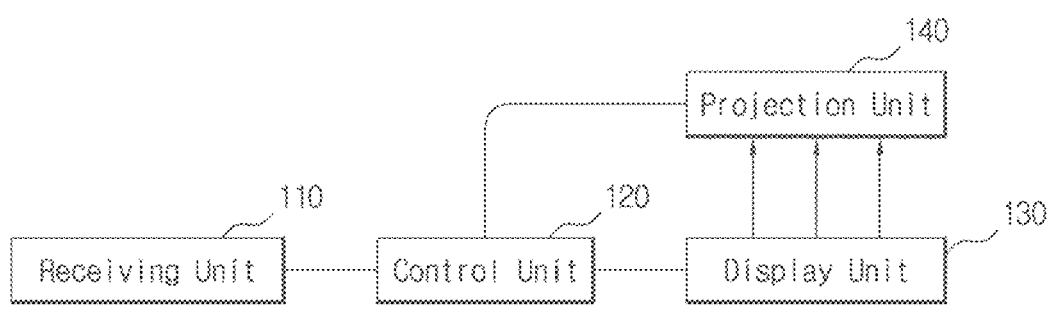
FIG. 1 is a block diagram briefly illustrating an apparatus for projecting a space image.

FIG. 1 is a block diagram briefly illustrating an apparatus for projecting a space image.

The apparatus for projecting a space image includes a receiving unit 110, a control unit 120, a display unit 130 and a projection unit 140.

The receiving unit 110 receives a space image from an external device. Here, the external device can be a device with a storage medium that stores the space image. The receiving unit 110 can receive a projection position signal additionally from the external device. The projection position signal can be a signal for controlling a motor that moves at least one of the display unit 130 and the projection unit 140, a signal for changing the status of the projection unit 140 having a liquid crystal lens or a liquid lens, or a signal for controlling a shutter installed in the projection unit 140.

The control unit 120 sends the space image to the display unit 130 and controls the display unit 130 to display the space image. Moreover, the control unit 120 controls operations of motors installed in the display unit 130 and the projection unit 140 or an operation of the projection unit 140 according to the projection position signal. The steps for having the control unit 120 control each functional unit according to the projection position signal will be described later in detail with reference to FIGS. 9 to 12.

The display unit 130 displays the space image. Here, the display unit 130 can be a common flat-screen display, a display having parallax barrier, a volume 3D display having a spinning screen, a stacked 3D display, an integral imaging based 3D display, or a hologram based 3D display.

The projection unit 140 can be any one of a convex lens, an array of convex lenses, a concave mirror, an array of concave mirrors, a concave lens, an array of concave lenses and a transparent spherical body. Moreover, the projection unit 140 can refer to one or more liquid crystal lenses or liquid lenses. Moreover, the projection unit 140 can include one or more of convex lenses, concave lenses and/or shutters. The projection unit 140 will be described later in detail according to different embodiments.

Figure 2:
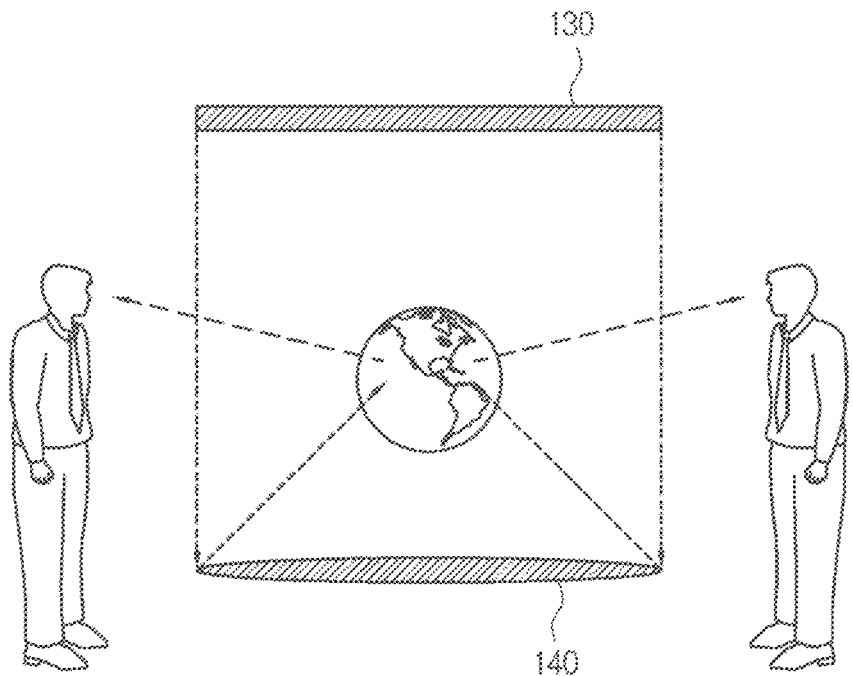
FIG. 2 illustrates a display unit and a projection unit in accordance with a first embodiment of the present invention.
Figure 3:
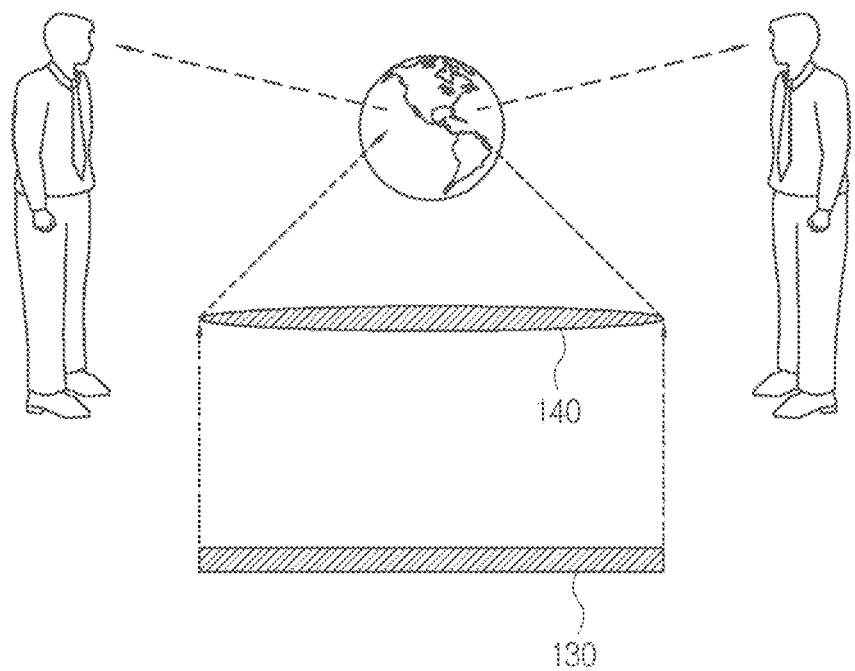
FIG. 3 illustrates a display unit and a projection unit in accordance with a second embodiment of the present invention.

FIG. 2 illustrates a display unit and a projection unit in accordance with a first embodiment of the present invention, and FIG. 3 illustrates a display unit and a projection unit in accordance with a second embodiment of the present invention. Here, the projection unit 140 in accordance with the first and second embodiments of the present invention is a convex lens.

Referring to FIG. 2, the display unit 130 displays the space image and projects light from an upper side to a lower side. The projection unit 140, which is a convex lens, reflects the light projected by the display unit 130 and projects the space image in between the display unit 130 and the very projection unit 140. Here, the positions of the display unit 130 and the projection unit 140 in accordance with the first embodiment can be reversed. In other words, the display unit 130 can display the space image and project the light from the lower side to the upper side, and the projection unit 140, which is a convex lens, can project the space image in between the display unit 130 and the very projection unit 140 by reflecting the light projected by the display unit 130.

Referring to FIG. 3, the display unit 130 that is positioned below the projection unit 140 displays the space image and projects light to the projection unit 140. Here, the projection unit 140 can project the light received from the display unit 130 to a space above the projection unit 140.

The convex lens in accordance with the first embodiment of the present invention can have a greater reflectivity than a convex lens in accordance with a second embodiment of the present invention. In other words, the convex lens in accordance with the second embodiment can have a greater transmissivity than the convex lens in accordance with the first embodiment of the present invention. Moreover, although it is described that the projection unit 140 is constituted with a single lens in the first and second embodiments of the present invention, it is possible that the projection unit 140 is constituted with an array of convex lenses that includes a plurality of convex lenses.

Figure 4:
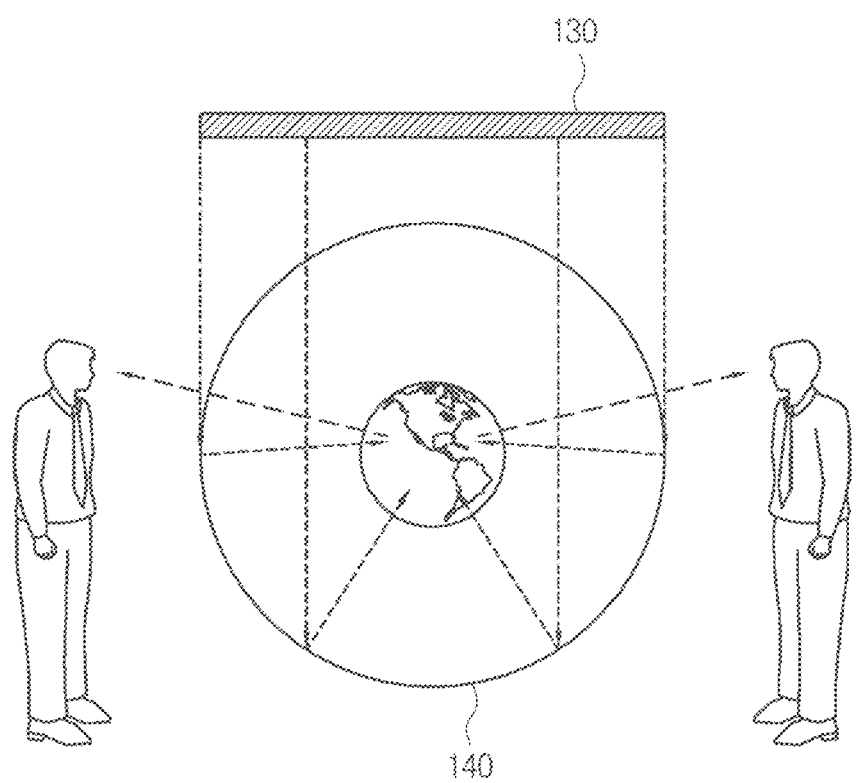
FIG. 4 illustrates a display unit and a projection unit in accordance with a third embodiment of the present invention.
Figure 5:
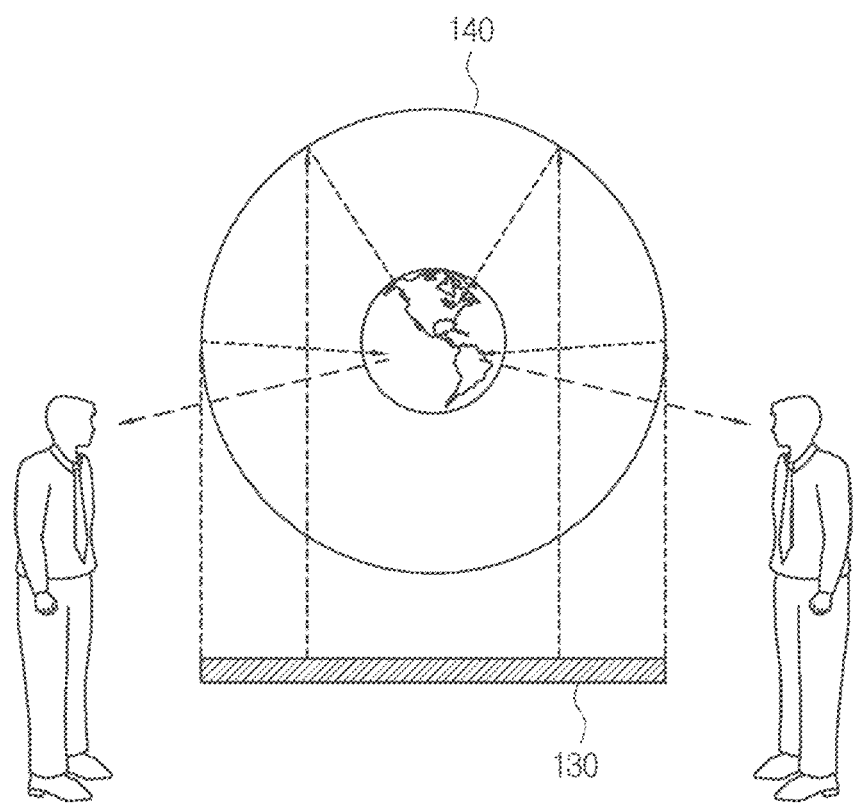
FIG. 5 illustrates a display unit and a projection unit in accordance with a fourth embodiment of the present invention.

FIG. 4 illustrates a display unit and a projection unit in accordance with a third embodiment of the present invention, and FIG. 5 illustrates a display unit and a projection unit in accordance with a fourth embodiment of the present invention. Here, the projection unit 140 in accordance with the third and fourth embodiments of the present invention can be a spherical body made with a transparent material.

Referring to FIG. 4, the display unit 130 displays a space image from an upper side to a lower side and projects light to the projection unit 140, which can then project the light received from the display unit 130 into the projection unit 140. FIG. 5 shows that the positions of the display unit 130 and the projection unit 140 shown in FIG. 4 are reversed.

Figure 6:
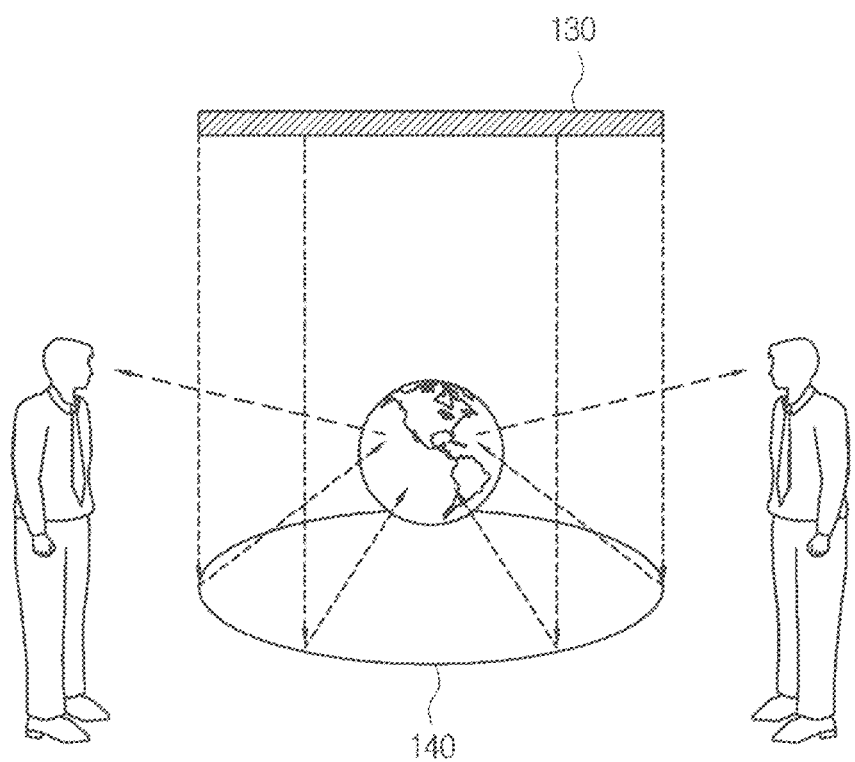
FIG. 6 illustrates a display unit and a projection unit in accordance with a fifth embodiment of the present invention.

FIG. 6 illustrates a display unit and a projection unit in accordance with a fifth embodiment of the present invention, and FIG. 7 illustrates a display unit and a projection unit in accordance with a sixth embodiment of the present invention. Here, the projection unit 140 in accordance with the fifth and sixth embodiments of the present invention can be a concave mirror.

Referring to FIG. 6, the display unit 130 displays a space image from an upper side to a lower side and projects light to the projection unit 140, which then can project the light received from the display unit 130 above the projection unit 140. FIG. 7 shows that the display unit 130 and the projection unit 140 shown in FIG. 6 are turned upside down. Referring to FIG. 7, the projection unit 140 can project the light received from the display unit 130 below the projection unit 140.

Moreover, although it is described that the projection unit 140 is constituted with a single concave mirror in the fifth and sixth embodiments of the present invention, it is possible that the projection unit 140 is constituted with an array of concave mirrors that includes a plurality of concave mirrors. In addition, it is possible that the concave mirror of the projection unit 140 can be substituted with a concave lens or an array of concave lenses.

As illustrated with reference to FIGS. 2 to 7, the apparatus for projecting a space image can project the space image by use of various forms of the projection unit 140.

Figure 8B:
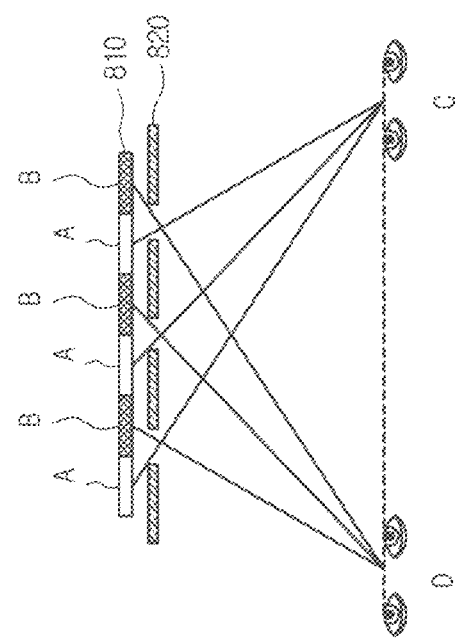
FIG. 8B illustrates an example of how the display unit of the apparatus for projecting a space image shown in FIG. 8A is applied in the first embodiment of the present invention.
Figure 8A:
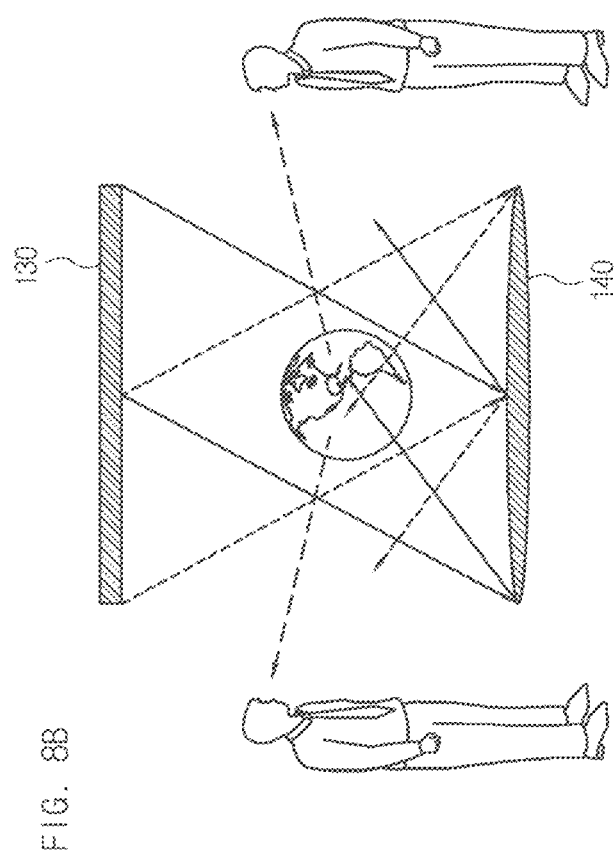
FIG. 8A illustrates a display unit of an apparatus for projecting a space image.

FIG. 8A illustrates a display unit of an apparatus for projecting a space image, and FIG. 8B illustrates an example of how the display unit of the apparatus for projecting a space image shown in FIG. 8A is applied in the first embodiment of the present invention.

Referring to FIG. 8A, the display unit includes a light-emitting part 810 and a parallax barrier 820.

The light-emitting part 810 displays the space image received from the control unit 120 and projects light. The light-emitting part 810 can include a device, for example, an LCD device, which can emit light based on pixel values included in the space image.

The parallax barrier 820 is a barrier screen in which barrier areas that block light and transmissive areas that allow light to permeate are alternately arranged. The parallax barrier 820 can be positions in front of the light-emitting part 810.

Here, in case that pixels corresponding to two images are alternately arranged in the space image received by the light-emitting part 810, the light projected by the light-emitting part 810 is projected in different directions according to the image. For example, if an image in which pixels of image "A" and pixels of image "B" are alternately arranged is displayed and light is projected by the light-emitting part 810, the parallax barrier 820 can project light corresponding to the pixels of image "A" in the direction of "C" and block the light from being projected in other directions. Moreover, the parallax barrier 820 can project light corresponding to the pixels of image "B" in the direction of "D" and block the light from being projected in other directions. Accordingly, image "A" having been permeated through the parallax barrier 820 can be projected in the direction of "C" only, and image "B" can be projected in the direction of "D" only. As a result, a user positioned in the direction of "C" can recognize image "A" only, and a user positioned in the direction of "D" can recognize image "B" only.

Referring to FIG. 8B, by arranging the display unit 180 shown in FIG. 8A on one side of the projection unit 140, the image recognized by the user can be made to be different according to the position of the user. Although images in two directions are illustrated in FIG. 8A and FIG. 8B, the image projected into the space can be recognized by the user in four different directions by forming the barrier areas and the transmissive areas of the display unit 130 in the form of a lattice.

The embodiments shown in FIGS. 2 to 8 use a display unit that displays a flat image. However, if a display unit that can render a volume (hence referred to as "volume display unit" hereinafter) is used, it is possible to project a space image in which the volume of the projected image is rendered. The volume display unit can be a spinning screen form of volume 3D display, a stacked 3D display, an integral imaging based 3D display, or a hologram based 3D display.

FIGS. 9A to 9C illustrate some examples of locations where the space image is projected using a volume display unit of the apparatus for projecting a space image. Hereinafter, it will be assumed that the display unit 130 is a volume display unit.

FIG. 9A illustrates a location where the space image is projected (referred to as "first space image location" hereinafter) when the display unit 130 is placed at a first position. FIG. 9B illustrates a location where the space image is projected (referred to as "second space image location" hereinafter) when the display unit 130 is placed at a second position that is closer to the lens than the first position. The first space image location is farther away from the projection unit 140 than the second space image location. In other words, as shown in FIG. 9C, the closer the display unit 130 is to the projection unit 140, the farther the space image can be projected from the lens.

Accordingly, the apparatus for projecting a space image can include a motor that can shift the position of the display unit 130, and the control unit 120 can receive the projection position signal from the receiving unit 110 and control the motor according to the projection position signal to change the position of the display unit 130. For example, in the case that the display unit 130 is placed at the first position, the control unit 120 can receive the projection position signal and shift the position of the display unit 130 to the second position according to the projection position signal. As a result, the apparatus for projecting a space image can have a fluid change of the depth of the space image by shifting the location where the space image is projected.

FIGS. 10A to 10C illustrate examples of locations where the space image is projected when the locations for a projection unit of the apparatus for projecting a space image is changed.

While FIGS. 9A to 9C illustrated changing the location where the space image is projected by shifting the position of the display unit 130, FIGS. 10A to 10C illustrate changing the location where the space image is projected by shifting the position of the projection unit 140.

Specifically, the apparatus for projecting a space image can have a motor that can move the position of the projection unit 140. The control unit 120 can receive the projection position signal from the receiving unit 110 and control the motor according to the projection position signal to shift the position of the projection unit 140. For example, in the case that the projection unit 140 is placed at a first position, the control unit 120 can receive the projection position signal and shift the position of the projection unit 140 to a second position according to the projection position signal. As a result, the apparatus for projecting a space image can have a fluid change of the depth of the space image by shifting the location where the space image is projected.

It shall be appreciated that shifting the display unit 130 or the projection unit 140 as illustrated with reference to FIGS. 9A to 10C can be utilized in the embodiments described with reference to FIGS. 2 to 7.

FIGS. 11A to 11C illustrate a display unit and a projection unit in accordance with a seventh embodiment of the present invention.

Referring to FIG. 11, the projection unit 140 includes a plurality of liquid crystal lenses or liquid lenses. Here, the liquid crystal lens or the liquid lens can be changed to an operation state, in which the liquid crystal lens or the liquid lens functions as a lens, or to a non-operation state, in which the liquid crystal lens or the liquid lens does not refract light, according to a control of the control unit 120. For example, the projection unit 140 has a first lens 1110, which is a liquid crystal lens or a liquid lens, placed in front of the display unit 130 and has a second lens 1120 in between the first lens 1110 and the display unit 130. The control unit 120 receives a projection position signal for projecting a space image at a first position from the receiving unit 110. The control unit 120 changes the second lens 1120 to the non-operation state in order to project the space image to the first position, which is farther away from the display unit 130, according to the projection position signal and changes the first lens 1110 to the operation state. Moreover, the control unit 120 receives a projection position signal for projecting a space image at a second position from the receiving unit 110. The control unit 120 changes the first lens 1110 to the non-operation state in order to project the space image to the second position, which is farther away from the display unit 130, according to the projection position signal and changes the second lens 1120 to the operation state. Accordingly, the apparatus for projecting a space image in accordance with the seventh embodiment of the present invention can change the position at which the space image is projected according to the projection position signal, as shown in FIG. 11C.

FIGS. 12A to 12D illustrate a display unit and a projection unit in accordance with an eighth embodiment of the present invention.

Figure 12A:
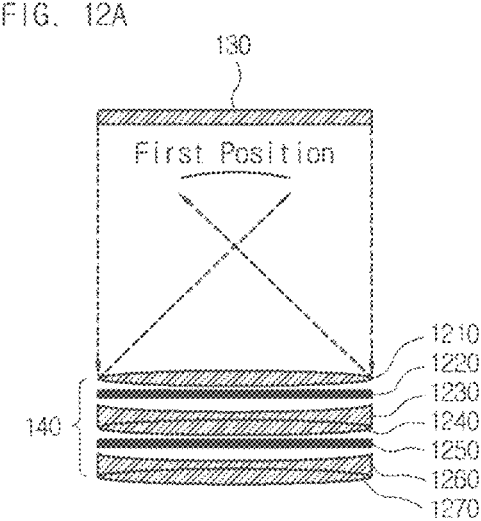
FIGS. 12A to 12D illustrate a display unit and a projection unit in accordance with an eighth embodiment of the present invention.

Referring to FIG. 12A, the projection unit 140 includes, and in the order of, a first convex lens 1210, a first shutter 1220, a first concave lens 1230, a second convex lens 1240, a second shutter 1250, a second concave lens 1260 and a third convex lens 1270. Here, in the case that the first shutter 120 is closed, a space image can be projected to a first position by the first convex lens 1210.

Figure 12B:
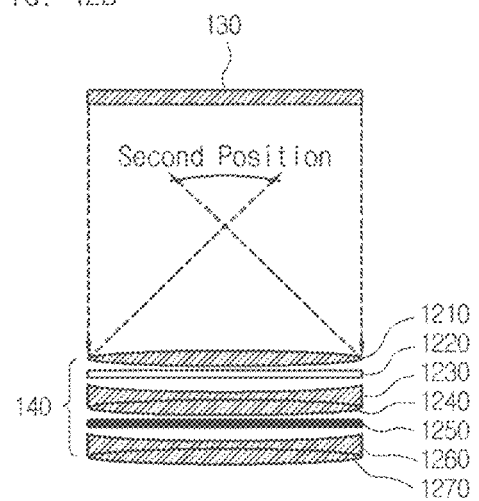

Referring to FIG. 12B, the first shutter 1220 is open, and the second shutter 1250 is closed. In this case, the direction of light refracted by the first convex lens 1210 can be compensated to its original state by the first concave lens 1230, and the light can be reflected by the second convex lens 1240, thereby projecting the space image to a second position.

Figure 12C:
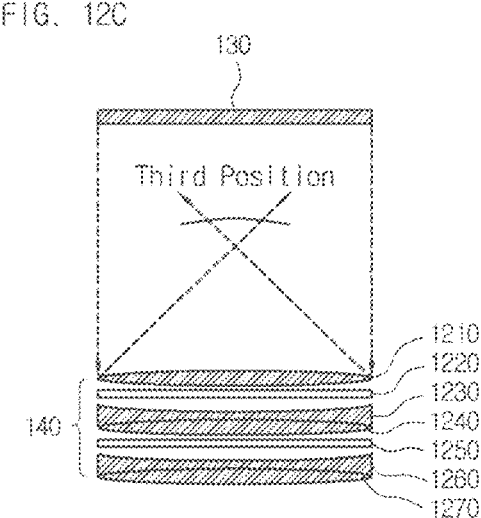

Referring to FIG. 12C, the first shutter 1220 and the second shutter 1250 are open. In this case, the direction of light refracted by the first convex lens 1210 can be compensated to its original state by the first concave lens 1230, and the direction of the light refracted again by the second convex lens 1240 can be compensated by the second concave lens 1260. Accordingly, the light can be reflected by the third convex lens 1270, and thus the space image can be projected to a third position.

Figure 12D:
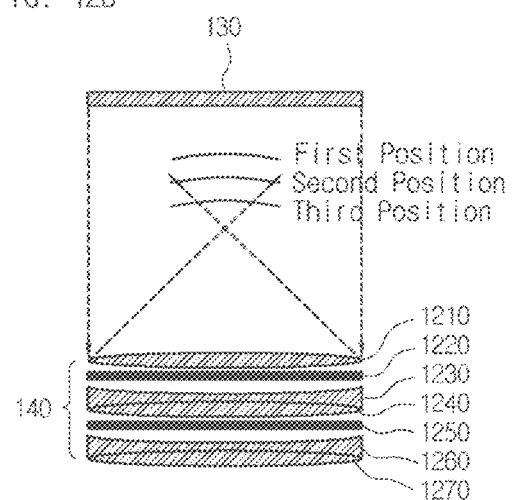

Therefore, as shown in FIG. 12D, in case the control unit 120 receives a projection position signal requesting to have the space image projected to any one of the first to third positions from the receiving unit 110, the control unit 120 can control the first shutter 1220 and the second shutter 1250 according to the projection position signal to have the space image projected to the one of the first to third positions.

FIG. 13 illustrates a display unit and a projection unit in accordance with a ninth embodiment of the present invention.

Referring to FIG. 13, the projection unit 140 of the apparatus for projecting a space image in accordance with the ninth embodiment of the present invention can include a floating lens 1310, which allows light emitted from the display unit 130 to permeate and projects the light in a first space, and a floor lens 1320, which reflects the light projected from the floating lens 1310 and projects the light in a second space. Accordingly, the user can recognize an image projected in the second space, located between the floating lens 1310 and the floor lens 1320, from every direction. The apparatus for projecting a space image in accordance with the ninth embodiment of the present invention can also prevent the user from directly seeing the light emitted from the display unit. Moreover, the apparatus for projecting a space image in accordance with the ninth embodiment of the present invention can ease the restriction of the distance by which the projection unit 140 can project the space image.

The embodiments described above include a wide variety of forms. Although it is not possible to describe all possible combinations to illustrate the variety of forms, it shall be appreciated by those who are ordinarily skilled in the art to which the present invention pertains that other combinations are possible. Therefore, it shall be appreciated that the present invention encompasses all other substitutions, modifications and permutations that belong to the claims appended below.

What is claimed is:

1. An apparatus for projecting a space image, comprising:
a receiving unit configured to receive the space image;
a display unit configured to display the space image and to emit light;
a control unit configured to control the display unit to display the space image; and
a projection unit configured to allow the light to permeate or reflect the light and to project the space image,
wherein the projection unit comprises a first lens and a second lens which are a liquid crystal lens or a liquid lens placed in front of the display unit,
wherein the receiving unit is configured to further receive a projection position signal for requesting a change of a position at which the space image is projected, and
wherein the control unit is configured to switch a state of each of the first lens and the second lens to an operation state or a non-operation state in accordance with the projection position signal.

2. The apparatus of claim 1, wherein the second lens is arranged in between the first lens and the display unit,
wherein the control unit is configured to switch the state of the first lens to the operation state and switch the state of the second lens to the non-operation state if the projection position signal is a signal for requesting the space image to be projected at a first position, and wherein the control unit is configured to switch the state of the first lens to the non-operation state and switch the state of the second lens to the operation state if the projection position signal is a signal for requesting the space image to be projected at a second position.

3. An apparatus for projecting a space image, comprising:
a receiving unit configured to receive the space image;
a display unit configured to display the space image and to emit light;
a control unit configured to control the display unit to display the space image; and
a projection unit configured to allow the light to permeate or reflect the light and to project the space image,
wherein the projection unit comprises, and in the order of, a first convex lens, a first shutter, a first concave lens, a second convex lens, a second shutter, a second concave lens and a third convex lens,
wherein the receiving unit is configured to further receive a projection position signal for requesting a change of a position at which the space image is projected, and
wherein the control unit is configured to control opening or closing of the first shutter and the second shutter in accordance with the projection position signal.

4. The apparatus of claim 3, wherein the first convex lens is closest to the display unit among said lenses,
wherein the controls unit is configured to control the first shutter to be closed if the projection position signal is for requesting the space image to be projected at a first position, and wherein the control unit is configured to control the first shutter to be opened and the second shutter to be closed if the projection position signal is for requesting the space image to be projected at a second position.

5. An apparatus for projecting a space image, comprising:
a receiving unit configured to receive the space image;
a display unit configured to display the space image and to emit light;
a control unit configured to control the display unit to display the space image; and
a projection unit configured to allow the light to permeate or reflect the light and to project the space image,
wherein the projection unit comprises:
a floating lens configured to project the space image at a first position by allowing the light emitted by the display unit to permeate; and
a floor lens configured to project the space image at a second position by reflecting the light projected from the floating lens,
wherein the floor lens is arranged in front of the display unit and the floating lens is arranged in between the display unit and the floor lens.

* * * * *